US008893965B2

(12) United States Patent
Mun et al.

(10) Patent No.: US 8,893,965 B2
(45) Date of Patent: Nov. 25, 2014

(54) IMAGE FORMING APPARATUS

(71) Applicant: Samsung Electronics Co., Ltd., Suwon-si (KR)

(72) Inventors: Sang Hoon Mun, Yongin-si (KR); Young Jaek Mok, Suwon-si (KR); Jin Ho Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/909,652

(22) Filed: Jun. 4, 2013

(65) Prior Publication Data

US 2013/0320082 A1   Dec. 5, 2013

(30) Foreign Application Priority Data

Jun. 4, 2012 (KR) .................. 10-2012-0059862

(51) Int. Cl.
*G06K 5/00* (2006.01)
*G03G 15/00* (2006.01)
*G06K 7/01* (2006.01)

(52) U.S. Cl.
CPC .............. *G06K 7/01* (2013.01); *G03G 15/5066* (2013.01)
USPC ........................................ 235/380; 235/375

(58) Field of Classification Search
USPC ................... 235/380, 375, 451, 492, 487
See application file for complete search history.

(56) References Cited

U.S. PATENT DOCUMENTS

| 8,107,844 B2 * | 1/2012 | Harigae ............... 399/81 |
| 2004/0081479 A1 * | 4/2004 | Kobayashi et al. ......... 399/80 |

* cited by examiner

*Primary Examiner* — Edwyn Labaze
(74) *Attorney, Agent, or Firm* — Staas & Halsey LLP

(57) ABSTRACT

An image forming apparatus is provided. The apparatus includes a body, a case forming an external appearance of the body, and a card reader disposed at an inside the case. The case includes a supporting member protruding from an inner surface of the case to support a lower end of the card reader, and a pressing member configured to press the card reader toward the inner surface of the case, so that various types of card readers having a different width, height, and/or thickness may be installed for use.

19 Claims, 5 Drawing Sheets

IMAGE FORMING APPARATUS

CROSS-REFERENCE TO RELATED APPLICATIONS

This application is related to, and claims priority to, Korean Patent Application No. 10-2012-0059862, filed on Jun. 4, 2012, in the Korean Intellectual Property Office, the disclosure of which is incorporated herein by reference.

BACKGROUND

1. Field

Embodiments of the present disclosure relate to an image forming apparatus provided with a card reader configured to read information contained in a card.

2. Description of the Related Art

In general, an image forming apparatus is an apparatus configured to form an image on a paper according to a signal that is input. Types of image forming apparatus include a printer, a copy machine, a facsimile, and a multi-function apparatus implemented by integrating the functionalities of more than one of the printer, the copy machine and the facsimile.

In an electro-photographic image forming apparatus, which is a type of an image forming apparatus, an electrostatic latent image is formed on a surface of a photosensitive body charged with a predetermined electric potential by radiating light onto the photosensitive body. A developer is supplied onto the electrostatic latent image to form a visible image. The visible image formed on the photosensitive body may be directly transferred to a printing medium, or is transferred to a printing medium by passing through an intermediate transfer unit, and the image transferred to the printing medium is fixed to the printing medium while passing through a fuser device, thereby completing the forming of an image.

Recently, a card reader configured to read a card containing user information has been considered that may be installed at the image forming apparatus such that the user information contained in the card may be read through the card reader to identify a user of the image forming apparatus, for example, for a security purpose. Thus, a user of an image forming apparatus may be recognized by recognizing a card is present.

SUMMARY

It is an aspect of the present disclosure to provide an image forming apparatus to which a card reader in a variety of sizes is installed.

Additional aspects of the disclosure will be set forth in part in the description which follows and, in part, will be obvious from the description, or may be learned by practice of the disclosure.

In accordance with an aspect of the present disclosure, an image forming apparatus includes a body, a case, a card reader, a supporting member, and a pressing member. The case may form an external appearance of the body. The card reader may be disposed at an inside the case. The supporting member may protrude from an inner surface of the case so as to support a lower portion of the card reader. The pressing member may be configured to press the card reader placed on the supporting member toward the inner surface of the case.

The pressing member may be formed of elastically deformable material so as to elastically support the card reader.

The case may include a hinge hole at which one end of the pressing member is rotatably installed, and a locking protrusion at which other end of the pressing member is supported in a locked state. The pressing member may include a hinge protrusion rotatably installed at the hinge hole, a locking part being locked with the locking protrusion, and an elastic part configured to generate elastic force.

The pressing member may include a wire that is bent such that a bent end portion of the wire forms the locking part. The wire may be bent in a U-shape and the U-shaped bent end portion of the wire forms the locking part. The hinge protrusion may be formed by bending both tips of the wire outwardly.

The elastic part may be formed by bending part of the wire in a spiral shape.

The locking protrusion may include a plurality of locking protrusions vertically extending while being disposed in parallel to each other.

The image forming apparatus may include a control panel configured to control an operation. The body may include a mounting part, at an upper side of which the control panel is mounted. The case may include a mounting case forming an external appearance of the mounting part. The card reader may be installed at an inside the mounting case.

The control panel may be disposed at a front side of the body. The card reader may be disposed at an inner side of a front surface portion of the mounting case.

The card reader may be disposed at a height that is substantially between 381 mm and 1370 mm while being disposed at a position that is lower than a position of the control panel.

The mounting case may include a hole allowing a front surface of the card reader to be exposed therethrough. The front surface of the card reader may be disposed at the hole so that the front surface of the card reader is disposed in a same plane with a front surface of the mounting case.

In accordance with an aspect of the present disclosure, an image forming apparatus includes a body, a control panel, and a card reader. The control panel may be configured to control an operation. The card reader may be configured to recognize a card. The body may include a mounting part, which is provided at one side of the body and at an upper side of which the control panel is mounted, and a mounting part case forming an external appearance of the mounting part. The mounting part case may include a supporting member protruding from an inner surface of the mounting part case to support a lower end of the card reader, and a pressing member configured to press the card reader toward an inner surface of the mounting part case.

The case may include a hinge hole at which one end of the pressing member is rotatably installed, and a locking protrusion at which other end of the pressing member is supported in a locked state. The pressing member may include a hinge protrusion rotatably installed at the hinge hole, a locking part locked with the locking protrusion, and an elastic part configured to generate elastic force.

The pressing member may include a wire that is bent such that a bent end portion of the wire forms the locking part. The wire may be bent in a U-shape and the U-shaped end portion of the wire may form the locking part. The hinge protrusion may be formed by bending both tips of the wire outwards or inwards. The elastic part may be formed by bending part of the wire in a spiral shape.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
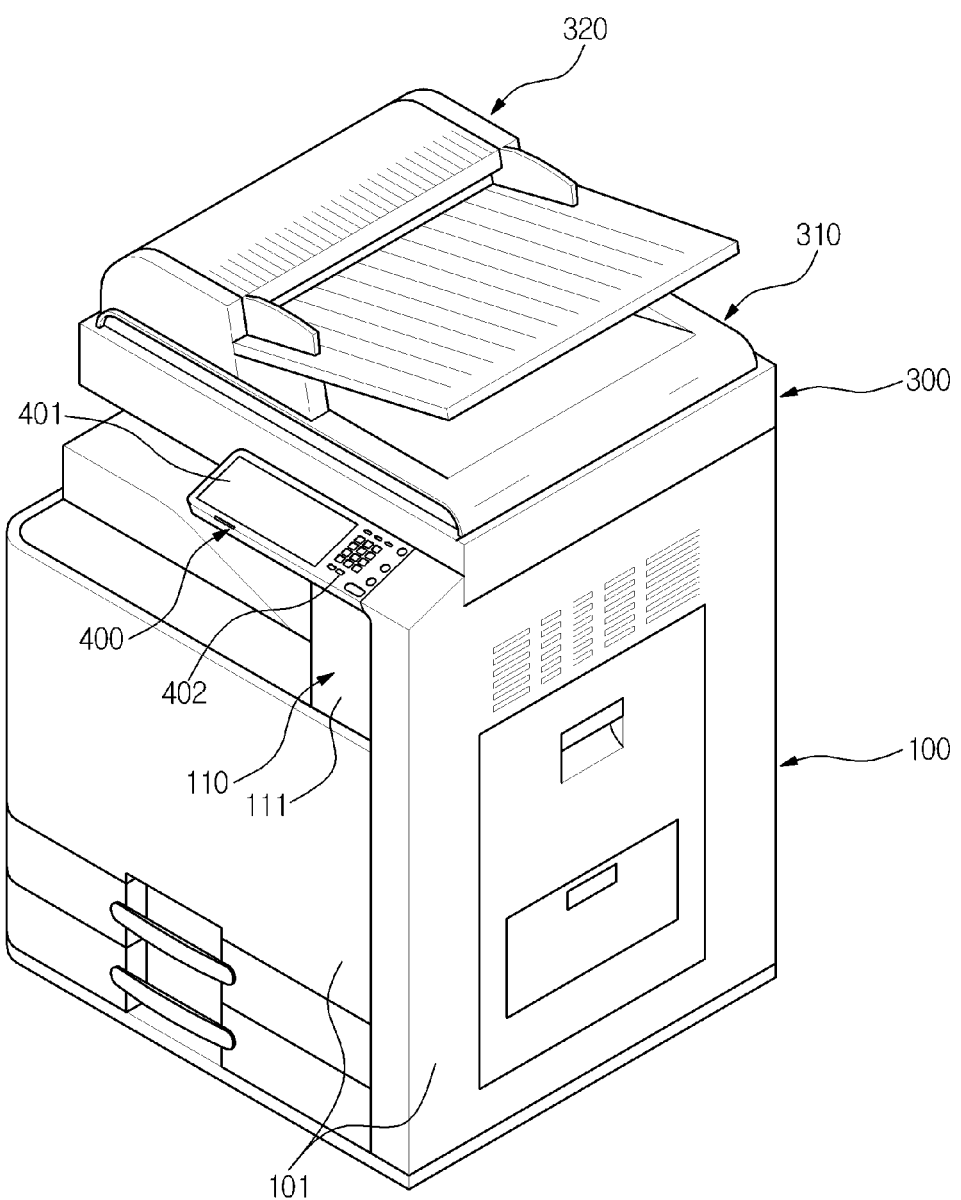
FIG. 1 illustrates an image forming apparatus in accordance with an embodiment of the present disclosure.

Reference will now be made in detail to the embodiments of the present disclosure, examples of which are illustrated in the accompanying drawings, wherein like reference numerals refer to like elements throughout.

Figure 2:
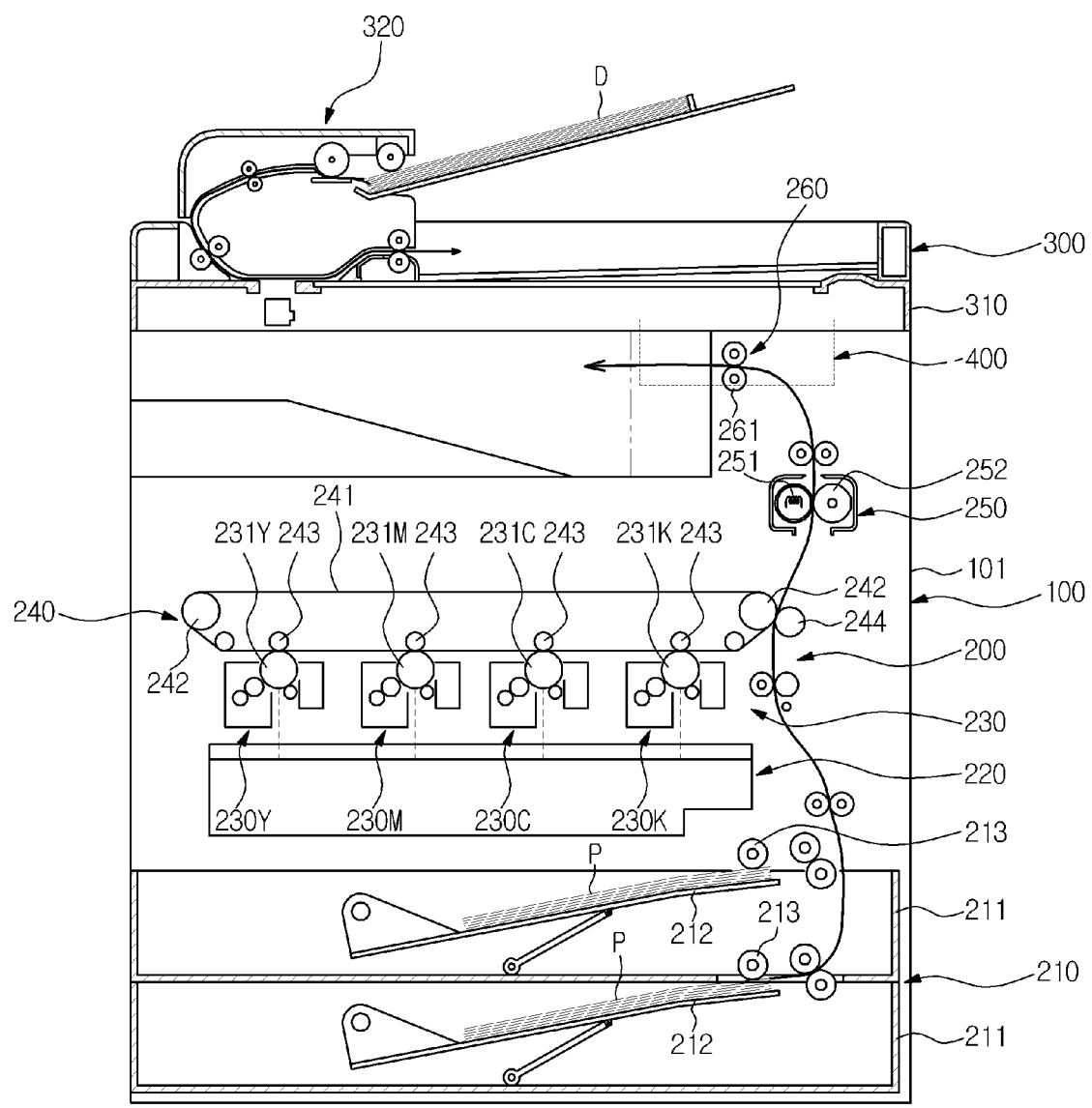
FIG. 2 is a cross-sectional view of an image forming apparatus in accordance with an embodiment of the present disclosure.

As illustrated in FIG. 1 and FIG. 2, an image forming apparatus includes a body 100 forming an external appearance thereof, a printing device 200 that may be provided at a lower portion of the body 100 to print an image on a printing medium (P), an image read out device 300 that may be provided at an upper portion of the body 100 to read out the image recorded on a document (D), and a control panel 400 that may be coupled to one side of the body 100 so that a user may control an operation of the image forming apparatus.

The body 100 includes a case 101 that may formed in a shape of a square housing while forming an external appearance of the body 100. The printing device 200 may be inside of the case 101. The image read out device 300 may be installed at an upper side of the case 101.

The printing device 200 may be configured to print an image according to a signal that is input from the image read out device 300, and/or according to a signal that is input from an outside device such as a PC. The printing device includes a printing medium supplying device 210, an optical scanning device 220, a developing device 230, a transfer device 240, a fuser device 250, and a paper discharge device 260.

The printing medium supplying device 210 includes a printing medium cassette 211 movably installed at a lower portion of the body 100, a knock-up plate 212 disposed at an inside the printing medium cassette 211 and at which the printing medium (P) is accumulated, and a pick-up roller 213 to pick up the printing medium (P) at the knock-up plate 212, for example, one piece at a time.

The optical scanning device 220 forms an electrostatic latent image on the surfaces of photosensitive bodies 231Y, 231M, 231C, and 231K by emitting light corresponding to image information onto the photosensitive bodies 231Y, 231M, 231C, and 231K.

The developing device 230 includes the photosensitive bodies 231Y, 231M, 231C, and 231K, at which electrostatic latent images are formed by the optical scanning device 220, and supplies a developing agent to the electrostatic latent images formed on the photosensitive bodies 231Y, 231M, 231C, and 231K such that the electrostatic latent images are developed into visible images. The developing device 230 includes four developers 230Y, 230M, 230C, and 230K at which different color developing agents are accommodated, respectively, that is, yellow (Y), magenta (M), cyan (C) and black (K) developing agents.

The transfer device 240 includes an intermediate transfer belt 241 supported by two supporting rollers 242 to transfer the visible images developed on the photosensitive bodies 231Y, 231M, 231C, and 231K to the printing medium (P), a plurality of first developing rollers 243 disposed opposite to the photosensitive bodies 231Y, 231M, 231C, and 231K while interposing the intermediate transfer belt 241 therebetween, and a second transfer roller 244 disposed opposite to one of the two supporting rollers 242 while interposing the intermediate transfer belt 241 therebetween. Thus, the visible images that are formed on the photosensitive bodies 231Y, 231M, 231C, and 231K are transferred to the intermediate transfer belt 241 by the first transferring rollers 243, and the visible images of the intermediate transfer belt 241 are transferred to the printing medium (P), which is supplied from the printing medium supplying device 210, by the second transfer roller 244.

The fuser device 250 includes a heating roller 251 applying heat to the printing medium (P') at which the visible image is transferred and a pressing roller 252 to press the printing medium (P) to the heating roller 251. Thus, the visible image transferred to the printing medium (P) may be fixed by receiving heat and pressure while passing through between the heating roller 251 and the pressing roller 252.

The paper discharge device 260 includes a paper discharge roller 261, and the paper discharge roller 261 discharges the printing medium (P), which passes through the fuser device 250, to an outside the body 100.

The image read out device 300 includes a reading frame 310 at an upper surface of which a document tray is provided, and an automatic document supplying device 320 rotatably installed at an upper side of the reading frame 310 to open/close the document tray such that a document (D) is automatically supplied.

The control panel 400 includes a display part 401 configured for a user to check the operation status of the image forming apparatus, and a manipulation part 402 provided with a plurality of buttons for a user to control the operation of the image forming apparatus.

The body 100 includes a mounting part 110 at which the control panel 400 may be installed. The case 101 includes a mounting part case 111 that forms an external appearance of the mounting part 110. In accordance with an embodiment of the present invention, the control panel 400 and the mounting part 110 at which the control panel 400 is mounted may be provided at a front side of the body 100 for a user to easily use the control panel 400. According to an exemplary embodiment of the present invention, the mounting part 110 may be formed at a front side of the paper discharge device 260.

Figure 3:
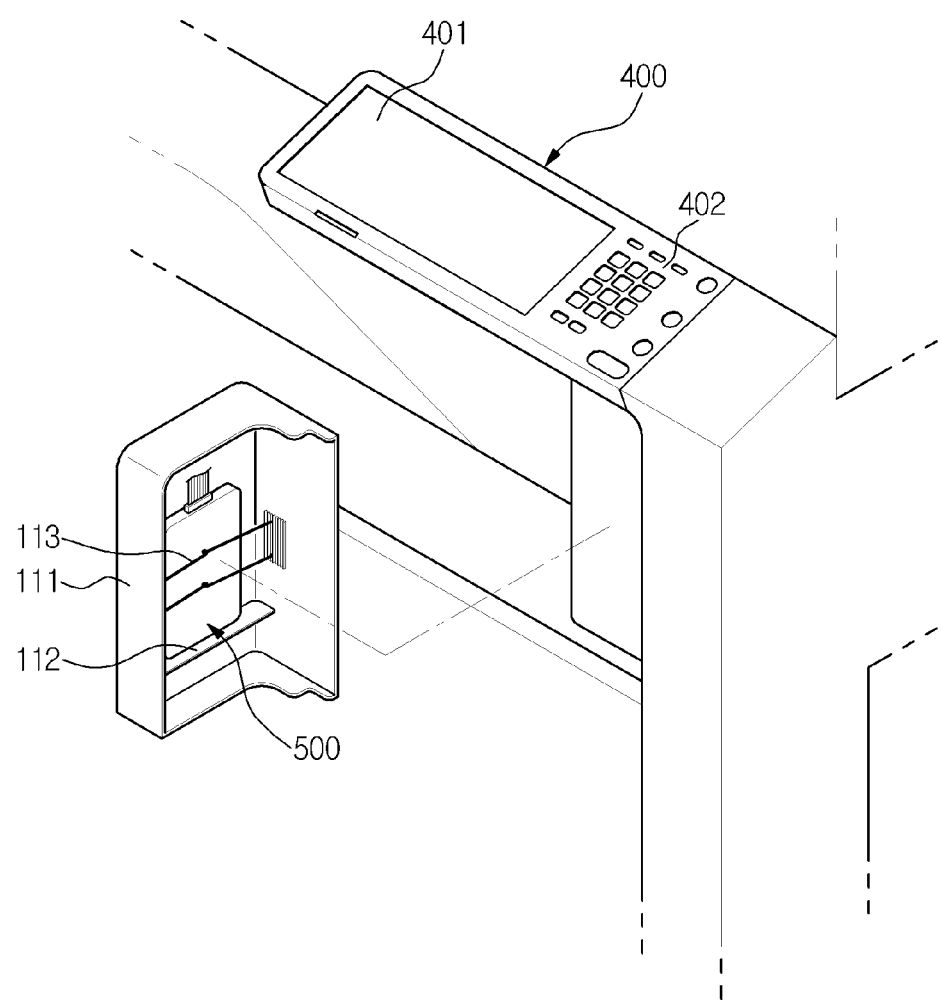
FIG. 3 and FIG. 4 illustrate an exemplary card reader installed on an image forming apparatus in accordance with an embodiment of the present disclosure.

The mounting part case 111 may be mounted, for example, below the control panel 400. The mounting part case 111 may form a portion of a front surface and a portion of a side surface of the mounting part 110. A card reader 500 configured to recognize a card may be disposed, for example, at a front side of an inside of the mounting part case 111, as illustrated on FIG. 3. Since the control panel 400 may be designed to be disposed at a height at which a user may easily use the control panel 400, the card reader 500 may be disposed at the mounting part 110 adjacent to the control panel 400, so a user may be able to have a card readily accessible to the card reader 500. Since the card reader 500 may be disposed at an inside of the mounting part case 111 that forms the mounting part 110, the card reader 500 may be disposed at a front side of the paper discharge device 260 in a similar manner as the mounting part 110.

The control panel 400, which is disposed at a front side of the body 100 as illustrated in an exemplary embodiment of the present disclosure, may be disposed at a height that is between, for example, 381 mm and 1370 mm, to facilitate a seated person, for example, a disabled person sitting in a wheelchair, to easily use the control panel 400. For the card reader 500 to also be easily used by a seated person, the card reader 500 may be also disposed at a height between about 381 mm and 1370 mm. The card reader 500 may be disposed at an inside of the mounting part case 110 at an upper side of which the control panel 400 is mounted, and thus the card reader 500 may be disposed at a position lower than the position of the control panel 400.

Figure 4:
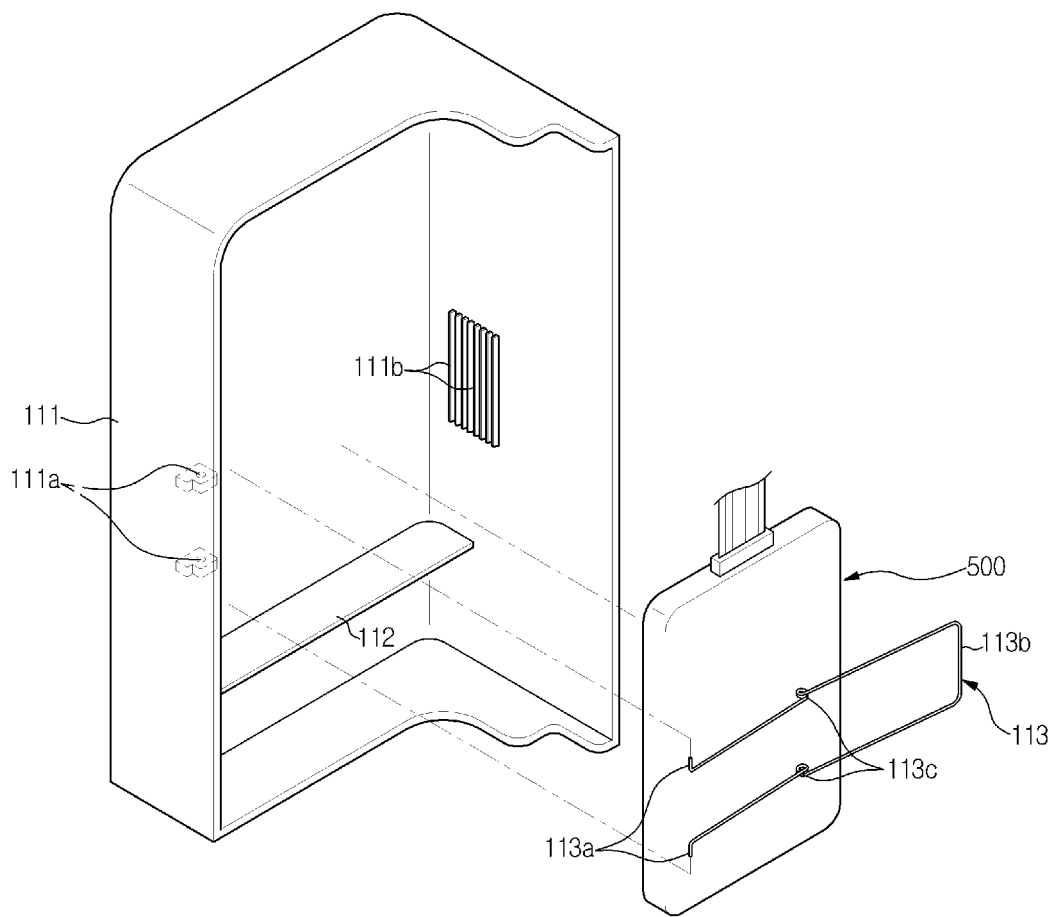

The mounting part case 111, as illustrated on FIG. 4, includes a supporting member 112 protruding from an inner surface of the mounting part case 111 to support a lower end of the card reader 500, and a pressing member 113 allowing the card reader 500 to come into contact with the inner surface of the mounting part case 111 by pressing the card reader 500 placed on the supporting member 112 toward the inner surface of the mounting part case 111.

For the installation of the pressing member 113, a pair of hinge holes 111a at which one end of the pressing member 113 is rotatably installed may be provided at one side surface of the inside the mounting part case 111 on top of one another. A locking protrusion 111b at which the other end of the pressing member 113 is supported in a locked state may be provided at the other side surface of the inside the mounting part case 111. In an exemplary embodiment of the present invention, a plurality of the locking protrusion 111b may be provided to correspond to varied thicknesses of the card reader 500 while being disposed in parallel to each other.

The pressing member 113 may be formed of elastically deformable material. The pressing member 113 may include at an end thereof a pair of hinge protrusions 113a rotatably installed at the pair of hinge holes 111a. At another end thereof the pressing member may include a locking part 113b locked with the locking protrusion 111b, and an elastic part 113c allowing the pressing member 113 to be elastically deformed.

According to an exemplary embodiment of the present invention, the pressing member 113 may be formed of a wire that is bent, for example, a U-shape. Thus, a U-shaped end portion of the wire forms the locking part 113b. Tips of the wire may be bent, for example, outwards or inwards to form the hinge protrusion 113a. A side portion of the wire may be bent in a spiral shape to form an elastic part 113c to generate elasticity.

Figure 5:
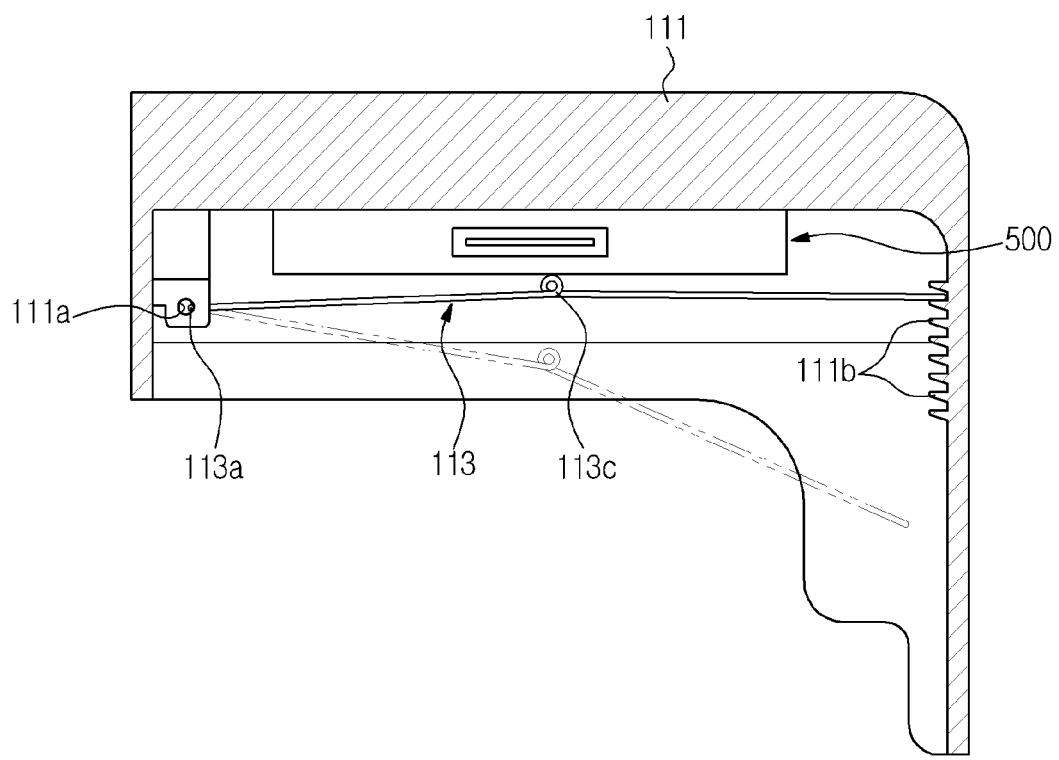
FIG. 5 illustrates a card reader installed on an image forming apparatus in accordance with an embodiment of the present disclosure.

When the locking part 113b of the pressing member 113 is separated from the locking protrusion 111b, the card reader 500 may be placed on the supporting member 112. By rotating the pressing member 113 as illustrated in FIG. 5 to an elastically deformed state such that the pressing member 113 is supported by the card reader 500 and the locking part 113b of the pressing member 113 is locked with the locking protrusion 111b, the card reader 500 maintains a state of contact with the inner surface of the mounting part case 111 due to the elastic restoration force of the pressing member 113.

Since the mounting part case 111 may be formed to have a significantly wide width and height compared to the card reader 500, and the card reader 500 may contact the mounting part case 111 with the pressing member 113 that is formed of the elastically deformable material, various types of card readers 500, each having, for example, a different width, height, and/or thickness may be installed inside the mounting part case 111.

In accordance with an exemplary embodiment of the present disclosure, the card reader 500 may be positioned at a front surface side of the body 100 and installed inside the mounting part case 111 positioned at a certain height allowing to facilitate accessibility by a user. But the present disclosure is not so limited, and may be installed, for example, at an inner side of a front surface or at an inner side of a side surface of the case 101, for example, that forms an external appearance of the body 100.

In accordance with an exemplary embodiment of the present disclosure, the card reader 500 may be supported by the inner surface of the mounting part case 111, but the present disclosure is not limited hereto. By forming a hole allowing the front surface of the card reader 500 to be exposed therethrough at the mounting part case 111 and by installing the front surface of the card reader 500 at the hole, the front surface of the card reader 500 may be disposed in a same plane with the front surface of the mounting part case 111.

The card reader may be provided with a lower end thereof being supported on the case or on the supporting member provided at an inner side of the mounting part case. Since the card reader may be attached to an inner surface of the case by the pressing member, various types of card readers each having a different width, height, and/or thickness may be installed at the case or at an inside the mounting part case for use Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus, comprising:
a body;
a case forming an external appearance of the body;
a card reader disposed at an inside the case;
a supporting member protruding from an inner surface of the case so as to support a lower end of the card reader; and
a pressing member pressing the card reader placed on the supporting member toward the inner surface of the case.

2. The image forming apparatus of claim 1, wherein:
the pressing member being formed of elastically deformable material so as to elastically support the card reader.

3. The image forming apparatus of claim 2, wherein:
the case comprises a hinge hole at which one end of the pressing member is rotatably installed, and a locking protrusion at which other end of the pressing member is supported in a locked state, and
the pressing member comprises a hinge protrusion rotatably installed at the hinge hole, a locking part being locked with the locking protrusion, and an elastic part configured to generate elastic force.

4. The image forming apparatus of claim 3, wherein:
the pressing member comprises a wire that is bent such that a bent portion of the wire forms the locking part; and
the hinge protrusion is formed by bending both tips of the wire.

5. The image forming apparatus of claim 4, wherein the wire is bent in a U-shape such that the U-shaped end portion of the wire forms the locking part.

6. The image forming apparatus of claim 4, wherein the hinge protrusion is formed by bending both tips of the wire outwards.

7. The image forming apparatus of claim 4, wherein:
the elastic part is formed by bending part of the wire in a spiral shape.

8. The image forming apparatus of claim 3, wherein:
the locking protrusion comprises a plurality of locking protrusions vertically extending while being disposed in parallel to each other.

9. The image forming apparatus of claim 1, further comprising:
a control panel configured to control an operation,
wherein the body comprises a mounting part, at an upper side of which the control panel is mounted;
the case comprises a mounting case forming an external appearance of the mounting part, and
the card reader is installed at an inside the mounting case.

10. The image forming apparatus of claim 9, wherein:
the control panel is disposed at a front side of the body, and
the card reader is disposed at an inner side of a front surface portion of the mounting case.

11. The image forming apparatus of claim 10, wherein:
the card reader is disposed at a height that is substantially between 381 mm and 1370 mm while being disposed at a position that is lower than a position of the control panel.

12. The image forming apparatus of claim 9, wherein:
the mounting case comprises a hole allowing a front surface of the card reader to be exposed therethrough, and
the front surface of the card reader is disposed at the hole so that the front surface of the card reader is disposed in a same plane with a front surface of the mounting case.

13. An image forming apparatus, comprising:
a body;
a control panel configured to control an operation; and
a card reader configured to recognize a card,
wherein the body comprises a mounting part, which is provided at one side of the body and at an upper side of which the control panel is mounted, and a mounting part case forming an external appearance of the mounting part, and
the mounting part case comprises a supporting member protruding from an inner surface of the mounting part case to support a lower end of the card reader, and a pressing member configured to press the card reader toward an inner surface of the mounting part case.

14. The image forming apparatus of claim 13, wherein:
the case comprises a hinge hole at which one end of the pressing member is rotatably installed, and a locking protrusion at which other end of the pressing member is supported in a locked state, and
the pressing member comprises a hinge protrusion rotatably installed at the hinge hole, a locking part locked with the locking protrusion, and an elastic part configured to generate elastic force.

15. The image forming apparatus of claim 14, wherein:
the pressing member comprises a wire that is bent such that a bent end portion of the wire forms the locking part;
the hinge protrusion is formed by bending both tips of the wire; and
the elastic part is formed by bending part of the wire in a spiral shape.

16. The image forming apparatus of claim 15, wherein the wire is bent in a U-shape and the U-shaped end portion of the wire forms the locking part.

17. The image forming apparatus of claim 15, wherein the hinge protrusion is formed by bending both tips of the wire outwards.

18. An accessible image forming apparatus, comprising:
a control panel configured to control an operation of the image forming apparatus;
a card reader disposed in a vicinity of the control panel; and
a case having a supporting member to support a lower end of the card reader,
wherein the card reader and the control panel are mounted to the image forming apparatus so as to be accessible to both a seated user and a standing user of the image forming apparatus.

19. The accessible image forming apparatus of claim 18, wherein an outer surface of the card reader is flush with an outer body of the image forming apparatus.

* * * * *